United States Patent [19]
Reinders et al.

[11] Patent Number: 5,351,705
[45] Date of Patent: Oct. 4, 1994

[54] METHOD AND APPARATUS FOR CONTROLLING FLUID PUMPS AND VALVES TO REGULATE FLUID PRESSURE AND TO ELIMINATE FLUID FLOW SURGES

[75] Inventors: Richard G. Reinders, Sullivan; Anton L. Novak, New Berlin; Frank R. Carlson, III, Hartland, all of Wis.

[73] Assignee: Watertronics, Inc., Hartland, Wis.

[21] Appl. No.: 104,396

[22] Filed: Aug. 9, 1993

Related U.S. Application Data

[63] Continuation of Ser. No. 935,289, Aug. 26, 1992, abandoned.

[51] Int. Cl.[5] ............................................. G05D 7/00
[52] U.S. Cl. ................................. 137/12; 137/487.8; 137/606; 417/5; 417/28
[58] Field of Search ................ 137/12, 486, 487.5, 137/606, 607; 417/5, 26, 28

[56] References Cited

U.S. PATENT DOCUMENTS

| | | | |
|---|---|---|---|
| 3,068,796 | 12/1962 | Pluger et al. | 417/26 X |
| 3,437,098 | 4/1969 | Stark | 137/552.5 |
| 3,776,249 | 12/1973 | Wailes et al. | 137/486 X |
| 4,119,391 | 10/1978 | Rutshtein et al. | 417/26 |
| 4,697,616 | 10/1987 | Ashcroft | 37/486 |
| 4,763,681 | 8/1988 | Cuny et al. | 137/486 X |
| 4,796,651 | 1/1989 | Ginn | 137/487.5 |
| 4,822,647 | 4/1989 | Nozaki et al. | 417/28 X |
| 5,020,564 | 6/1991 | Thoman | 137/487.5 |
| 5,146,941 | 9/1992 | Statler | 137/487.1 X |

FOREIGN PATENT DOCUMENTS

| | | | |
|---|---|---|---|
| 0027893 | 2/1983 | Japan | 417/5 |
| 0119077 | 7/1984 | Japan | 417/5 |

OTHER PUBLICATIONS

Pressure Monitor Brochure (No. S-PM103/11-74 4 pages), Clay Pool Controls Co., Mountain View, Calif.

*Primary Examiner*—John Rivell
*Attorney, Agent, or Firm*—Joseph S. Heino

[57] ABSTRACT

A method and apparatus for supplying and delivering fluids at a constant pressure includes means for measuring fluid pressure, means for measuring fluid flow and means for actuating fluid valves to control fluid pressure and flow through the valves. A programming means is also included so that fluid pressure and flow measurements are processed and the fluid valves are actuated according to a preprogrammed scheme.

12 Claims, 2 Drawing Sheets

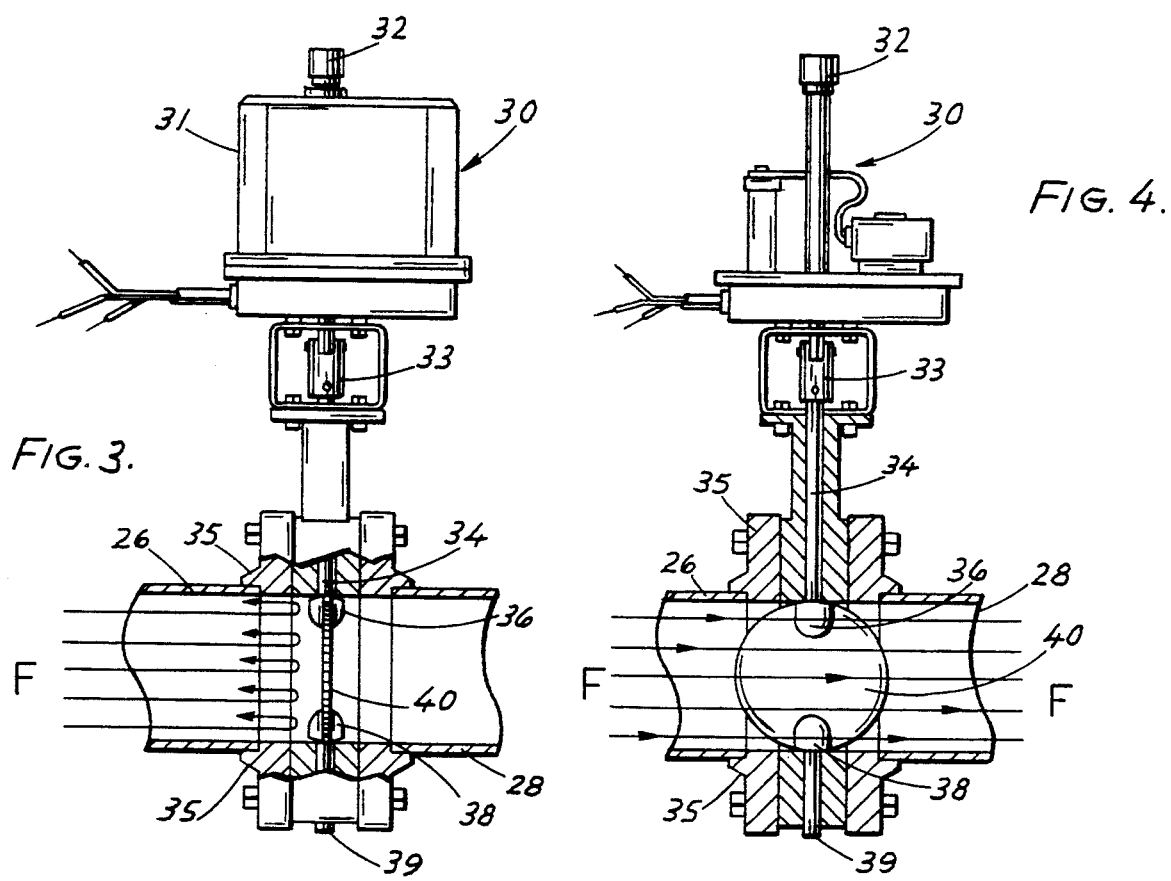

METHOD AND APPARATUS FOR CONTROLLING FLUID PUMPS AND VALVES TO REGULATE FLUID PRESSURE AND TO ELIMINATE FLUID FLOW SURGES

This application is a continuation of application Ser. No. 07/935,289, filed Aug. 26, 1992 now abandoned.

SUMMARY OF THE INVENTION

This invention relates generally to pressure regulating methods and devices. More particularly, it relates to a method and apparatus for supplying and delivering fluids at a constant pressure and without surges.

There are many agricultural, municipal and industrial uses for fluid pumps and pumping stations. For example, such pumps and pumping stations are used agriculturally in turf irrigation systems, in aerial and center-pivot irrigation systems, in de-watering stations and in chemical injection systems. Similarly, such pumps and pumping stations are used municipally in waste water treatment plants, in potable water booster systems for high-rise buildings and in golf courses and parks. Others may be used for such things as snow-making facilities and decorative fountains.

When such fluid pumps and pumping stations are used, it is necessary to somehow regulate the fluid pressure which is created by the pumps. Currently, two methods of pressure regulation are generally utilized. One method utilizes a pilot controlled hydraulic regulating valve which utilizes springs and diaphragms to regulate fluid pressure. The second method utilizes a variable speed pump. In the experience of these inventors, there are disadvantages with each method.

For example, the hydraulic regulating valves typically use a pilot to monitor down-stream fluid pressure. If the fluid pressure is low, the pilot opens which causes the main valve to likewise open. When the fluid pressure rises, the pilot closes thereby causing the main valve to close. Problems occur whenever the pilot becomes dirty, worn or is frozen. Even if the pilot is adjusted perfectly, the hydraulic valve will inherently overshoot demand and cause surges. This is because the pilot and the hydraulic valve know one thing—that the pressure of the system is either above or below its set point. Therefore, even if the fluid pressure is rising very rapidly, the valve will not close until the pressure exceeds the set point. When it finally does, the valve cannot respond rapidly enough to close down and a pressure surge inevitably enters the system.

Also, because of the hydraulic valve's design, the flow of fluid through the valve is quite turbulent. This turbulence, in part due to inherent restriction within the valve caused by obstructions from springs, diaphragms and other mechanical parts internal to it, creates a pressure drop of as much as 10 to 15 psi across the valve. This pressure drop is, in effect, wasted energy and can represent as much as a 10 to 15 per cent inefficiency in the system.

The variable speed pump has disadvantages of its own. Quite obviously, changing the variable speed pump's speed changes its performance. Because this is done electronically and/or mechanically, the primary disadvantages of this method are its price and its relative high degree of complexity.

The present invention overcomes these problems and disadvantages. It provides a new and useful method and apparatus for sensing and regulating fluid pressure whereby fluid is delivered at a constant pressure and without surges. The present invention accomplishes this by providing electronic sensors mounted on a discharge manifold to send operating parameters to a central control unit. The down-stream fluid pressure is monitored using a pressure transducer, a device which produces a voltage proportional to system pressure. The higher the pressure, the higher the voltage. Unlike the pilot used on hydraulic valves, the transducer is not limited to one setpoint. The transducer's output is monitored by the central control unit which calculates not only what the pressure is, but how fast it is changing. Furthermore, the central control unit may be so configured that it can control any number of electronically actuated butterfly valves situated at the discharge end of each individual pump to provide consistent pressure regulation throughout all flow ranges. Because the valves start in a closed position, systems surges are eliminated. In an open position, the only part of an electronically actuated butterfly valve subject to fluid flow obstruction is the valve disk and seat. There are no obstructions from springs, diaphragms or other mechanical parts. Accordingly, the pressure drop across such a valve at full flow is never more than 1 psi. Contrast this with the hydraulic valve which, by design, creates a 10 to 15 psi drop across it. This efficiency in the electronically actuated butterfly valve also allows pumps and pump motors to be selected for flow and pressure specifications without oversizing.

In summary, the advantages of the invention are that it provides smooth and consistent pressure regulation over an entire flow range, it eliminates surges from the system and has no mechanical parts to clog or degrade. This enables the application of the invention in a greater area of use and the use of a central control unit allows for program changes without rewiring or reconfiguration of the system components. The foregoing and other advantages of the method and apparatus of the present invention will be apparent from the description which follows.

BRIEF DESCRIPTION OF THE DRAWINGS

FIG. 3 is an enlarged and cross-sectioned elevational view of one of the electrically actuated butterfly valves used in the apparatus shown in FIG. 2 and showing the valve in its closed position.

FIG. 4 is another view of the butterfly valve shown in FIG. 3 but showing the valve in its open position.

DETAILED DESCRIPTION

Figure 1:
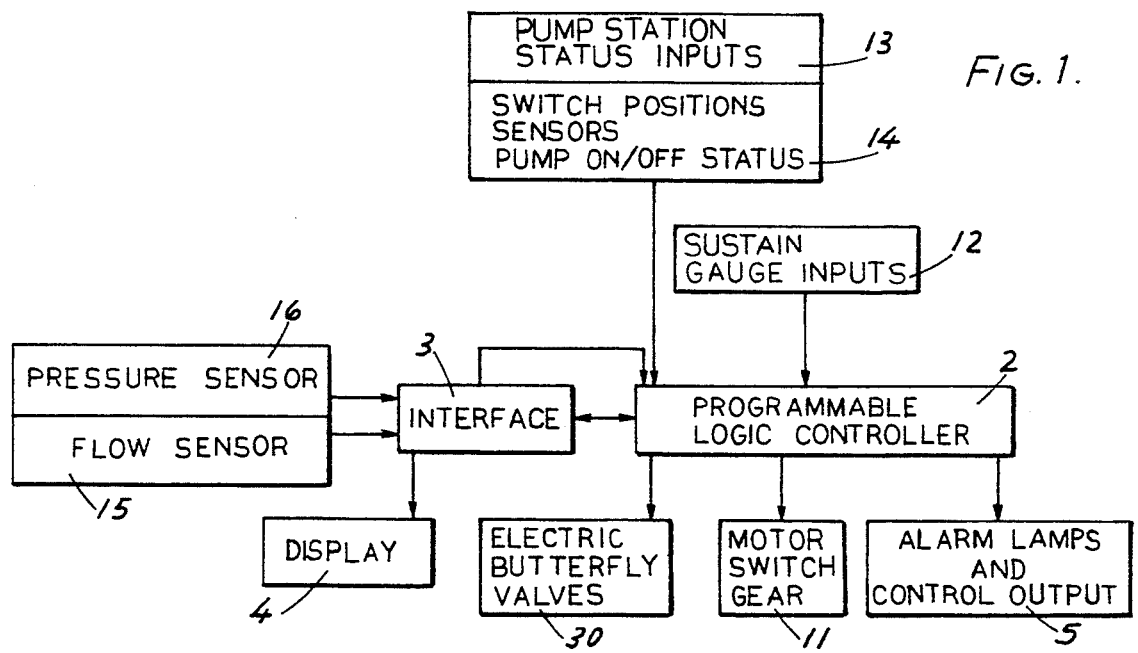
FIG. 1 is a schematic in block diagram form illustrating a system which utilizes the method and apparatus of the present invention.

Referring now to the drawings in detail, FIG. 1 shows a schematic in block diagram form illustrating a system which utilizes the method and apparatus of the present invention. At the center of the system is a programmable logic controller 2 which receives information by virtue of certain system inputs. In the method and apparatus of the present invention the system inputs relate to measurements of fluid pressure and fluid flow. The controller 2 processes this inputted information according to a preprogrammed format and produces certain outputs in response to the processed information.

The programmable controller 2 is provided with an interface 3 through which this fluid pressure and fluid flow information, registered by a pressure sensor 15 and a flow sensor 16 respectively, is fed. The interface 3 provides the system with the ability to continuously exhibit the measured and inputted pressure and flow information. This is provided by means of a display 4. This allows the user to observe current conditions of fluid flow and fluid pressure. The interface 3 likewise feeds the pressure and flow information, or current conditions, to the programmable logic controller 2 thereby allowing it to signal the electrically actuated butterfly valves 30 and motor switch gear 11 which are essential to the proper maintenance of fluid flow and fluid pressure within the system. In this configuration, the programmable logic controller 2 can be programmed to react to an infinite variety of flow and pressure conditions whereby the electrically actuated butterfly valves 30 and motor switch gear 11 are functionally adapted to operate so as to supply and deliver fluids at a constant rate and without surges.

The programmable logic controller 2 likewise controls alarm lamps and other control output devices 5 by which the system can be further monitored. Sustain gauge inputs 12, pump station status inputs 13 and information from switch position sensors 14 is also be processed within the programmable logic controller 2.

Figure 2:
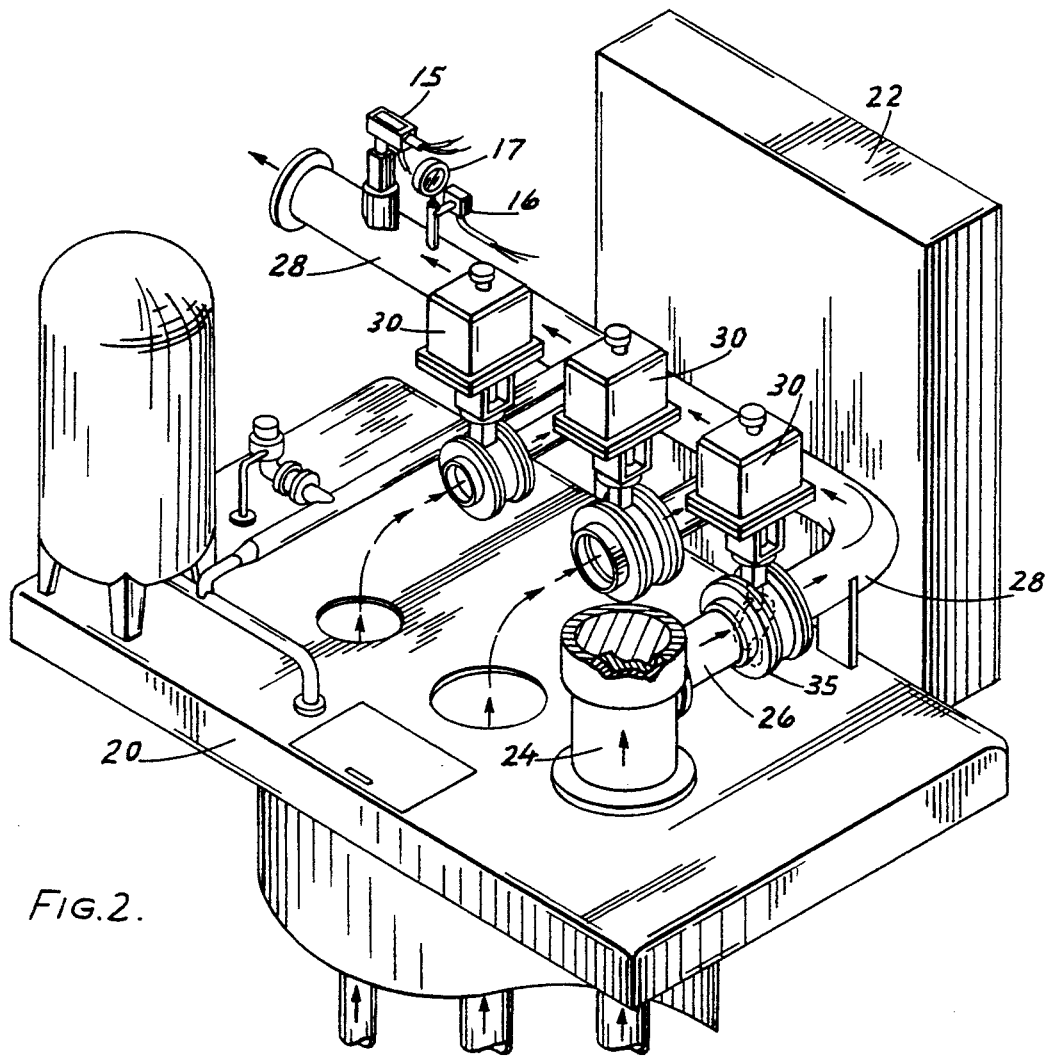
FIG. 2 is a perspective view of an apparatus constructed in accordance with the present invention.

FIG. 2 illustrates a preferred embodiment of an apparatus utilizing the method of the present invention. A base 20 is provided with pump discharge heads 24. The fluid pumps which force fluid up and through the discharge heads 24 are not shown. Such pumps are of varying sizes and types and the size or type is not important for understanding the principles of this invention. Attached to the pump discharge head 24 is an upstream portion 26 of a fluid discharge manifold 28 through which the pumped fluid F flows. Downstream from the discharge head 24 and along the fluid discharge manifold 28 is mounted a flow sensor 15. A pressure transducer 16 in combination with a pressure needle valve 17 is mounted in the same general area along the discharge manifold 28. The flow sensor 15 and the pressure transducer 16 and pressure needle valve 17 are electrically connected to the programmable logic controller 2 and interface 3 contained within the electrical cabinet 22. Also connected to the logic controller 2 but external to the electrical cabinet 22 are the electrically actuated butterfly valves 30. While three of such electrically actuated butterfly valves 30 are shown in the preferred embodiment, it is understood that any number of such valves may be used in combination with the logic controller 2 to achieve the desired result.

Referring now to FIGS. 3 and 4, a detailed view of one of the electrically actuated butterfly valves 30 shown in FIG. 2 is shown. The electrically actuated butterfly valve 30 includes a housing 31 at its upper portion within which is contained an electrical actuator 37. The electrical actuator 37 rotates the upper stabilizing pin 32 and serves to rotate the middle pin 34 contained within the butterfly valve 35 by means of a pin connector 33. At the lower portion of the butterfly valve 35 is a lower stabilizing pin 39. Between the upper pin 34 and the lower pin 39 of the butterfly valve 35 is situated the valve disk 40. The valve disk 40 is connected to the middle pin 34 by means of an upper seat 36 and to the lower pin 39 by means of a lower seat 38.

In operation, the disk 40 of the butterfly valve 35 is, by virtue of the electrical actuator 37, made to rotate between a fully closed and a fully open position as shown in FIG. 3 and FIG. 4, respectively. With the disk 40 in the fully closed position as shown in FIG. 3, flow of the fluid F within the discharge manifold 28 and through the valve 35 is prohibited. With the disk 40 of the butterfly valve 35 rotated 90° about its axis, as shown in FIG. 4, the fluid F within the discharge manifold 28 is allowed to flow freely through the valve 35 and through the manifold 28. Any position assumed by the disk 40 between these two extremes reduces or permits fluid flow in a measurable amount.

In application, the system is found to exist in one of three conditions—requiring an increase in flow, requiring a reduction in flow or keeping flow constant. In any of those three conditions, the flow sensor 15, and pressure sensor 16 monitor pressure and flow of the fluid F, respectively, downstream from the pumps and butterfly valves 30. The pressure and flow regulation is achieved by changing the outlet area for the fluid F, i.e. actuating the valve disk 40, thus creating a variable pressure drop which is utilized to hold the system pressure constant.

In the flow increase condition, the pressure sensor 15 and flow sensor 16 will each react to present conditions and the programmable logic controller 2 will process the information requiring one or more of the electrically actuated butterfly valves 30 to open according to a preprogrammed scheme. This may require one or more of the valves 30 to open fully, may require one or more of the valves 30 to open partially or may require only a certain number of valves 30 to open fully or partially.

In the flow reduction mode the same pressure and flow sensors 15, 16 will again react to the downstream conditions and will send the information to the logic controller 2. The controller 2 will, according to its preprogrammed scheme, actuate the butterfly valves 30 so as to reduce flow through the manifold 28 by reducing all or a part of the flow within one or more of the valves 30 or within several of them.

In the flow constant condition, which really incorporates the function of the first two conditions but on a smaller scale, the flow and pressure sensors 15, 16 will detect small fluxations in overall downstream system flow and pressure and inform the logic controller 2 of those fluxations. The controller 2, in turn, will actuate the valves 30 so that all or some of them close down or open up in some predetermined amount such that pressure and flow is held constant.

A particularly useful feature of the method and apparatus of the present invention is that fluid pump wear and tear is minimized. Once adequate pressure is achieved, the system can determine whether unneeded fluid pumps are operating. Fluid pumps which are not needed are retired leaving the optimum configuration for demand. As the demand changes, fluid pumps are added or retired as needed. Particularly if the pumping system is equipped with two or more pumps, those pumps can be alternately started to maintain equal wear. Also, since pressure regulation is controlled electronically rather than hydraulically, the parameters of the programable controller 2 can be changed at any time and for any reason.

From the foregoing description of the illustrative embodiment of the invention set forth herein, it will be apparent there has been provided a new and useful method and apparatus for sensing and regulating fluid pressure whereby fluid is delivered at a constant pressure and without surges. The method and apparatus utilizes a programmable controller which may be configured to control any number of electrically actuated butterfly valves situated at the discharge end of a fluid pump to provide consistent pressure regulation throughout all flow ranges.

The principles of this invention having been fully explained in connection with the foregoing, we hereby claim as our invention:

1. A method for supplying and delivering fluids at a constant pressure and without fluid surges within a system which comprises the steps of
providing at least one fluid pump,
providing an actuable fluid valve downstream from each of said fluid pump or pumps, said valve or valves being actuable between a fully closed and a fully opened position to correspondingly prevent and allow fluid flow through such valve,
providing a fluid pressure measuring means downstream from said fluid valve or valves,
providing a fluid flow measuring means,
measuring fluid pressure within the system,
measuring the rate of change of fluid pressure within the system,
measuring fluid flow within the system, and
variably actuating said valve or valves to control fluid pressure and fluid flow through, and to prevent fluid surges within, the system, said valve actuating step including a pump switching step, said pump or pumps being switchable between "on" and "off" fluid pumping states to correspondingly pump and not pump fluid within the system.

2. The method of claim 1 including, prior to said valve actuating step, the step of providing a programming means for processing the fluid pressure, fluid pressure rate of change and fluid flow measurements, and the pump switching and valve actuating step includes switching the pump or pumps, actuating the fluid valve or valves and controlling the opening and closing speed of the valve or valves according to a preprogrammed scheme.

3. The method of claim 2 wherein said valve providing step comprises providing electrically actuated valves.

4. In a fluid flow system having at least one actuable fluid pump and an actuable fluid valve downstream from each such pump, a method for supplying and delivering fluids at a constant pressure and without fluid surges within the system which comprises the steps of
measuring the fluid pressure within the system,
measuring the rate of change of the fluid pressure within the system,
measuring fluid flow within the system,
providing a programming means so that the fluid pressure, fluid rate of change and fluid flow measurements are processed according to a preprogrammed scheme, and
actuating said fluid pump or pumps and valve or valves to control fluid pressure and flow through, and to prevent fluid surges in, the system according to a preprogrammed scheme.

5. An apparatus for supplying and delivering fluids at a constant pressure within a system and without fluid surges which comprises
means for measuring fluid pressure within the system,
means for measuring the rate of change of fluid pressure within the system,
means for measuring fluid flow within the system,
at least one actuable fluid pump,
means for actuating said pump or pumps, said pump or pumps being actuable between states to pump and not pump fluid within the system,
an actuable fluid valve downstream from each fluid pump,
means for variably actuating said valve or valves, said valve or valves being actuable between a fully closed and a fully opened position, and
a programming and processing means whereby fluid pressure, fluid pressure rate of change and fluid flow measurements are processed and the fluid pump or pumps and the fluid valve or valves are actuated and the opening and closing speed of the valve or valves is controlled according to a preprogrammed scheme to control fluid pressure and fluid flow through, and to prevent fluid surges within, the system.

6. The apparatus of claim 5 wherein said fluid valves are electrically actuated valves.

7. A method for supplying and delivering fluids at a constant pressure at varying flow demands and without fluid surges within a system which comprises the steps of
providing at least one fluid pump,
providing an actuable fluid valve downstream from each of said fluid pump or pumps, said valve or valves being actuable between a fully closed and a fully opened position to correspondingly prevent and allow fluid flow through such valve,
providing a fluid pressure measuring means downstream from said fluid valve or valves,
providing a fluid flow measuring means,
measuring fluid pressure within the system,
measuring the rate of change of fluid pressure within the system,
measuring fluid flow within the system, and
variably actuating said valve or valves to control fluid pressure and fluid flow through, and to prevent fluid surges within, the system and to maintain a constant system pressure at varying flow demands, said valve actuating step including a pump switch step, said pump or pumps being switchable between "on" and "off" fluid pumping states to correspondingly pump and not pump fluid within the system.

8. The method of claim 7 including, prior to said valve actuating step, the step of providing a programming means for processing the fluid pressure, fluid pressure rate of change and fluid flow measurements, and the pump switching and valve actuating step includes switching the pump or pumps, actuating the fluid valve or valves and controlling the opening and closing speed of the valve or valves according to a preprogrammed scheme.

9. The method of claim 8 wherein said valve providing step comprises providing electrically actuated valves.

10. In a fluid flow system having at least one actuable fluid pump and an actuable fluid valve downstream from each such pump, a method for supplying and delivering fluids at a constant pressure at varying flow demands and without fluid surges within the system which comprises the steps of
measuring the fluid pressure within the system,
measuring the rate of change of the fluid pressure within the system,
measuring fluid flow within the system, providing a programming means so that the fluid pressure, fluid rate of change and fluid flow measurements are processed according to a preprogrammed scheme, and actuating said fluid pump or pumps and valve or valves to control fluid pressure and flow through, and to prevent fluid surges in, the system and to maintain a constant system pressure at varying flow demands according to a preprogrammed scheme.

11. An apparatus for supplying and delivering fluids at a constant pressure at varying flow demands within a system and without fluid surges which comprises means for measuring fluid pressure within the system, means for measuring the rate of change of fluid pressure within the system, means for measuring fluid flow within the system, at least one actuable fluid pump, means for actuating said pump or pumps, said pump or pumps being actuable between states to pump and not pump fluid within the system, an actuable fluid valve downstream from each fluid pump, means for variably actuating said valve or valves, said valve or valves being actuable between a fully closed and a fully opened position, and a programming and processing means whereby fluid pressure, fluid pressure rate of change and fluid flow measurements are processed and the fluid pump or pumps and the fluid valve or valves are actuated and the opening and closing speed of the valve or valves is controlled according to a preprogrammed scheme to control fluid pressure and fluid flow through, and to prevent fluid surges within, the system and to maintain a constant system pressure at varying flow demands.

12. The apparatus of claim 11 wherein said fluid valves are electrically actuated valves.

* * * * *